(12) United States Patent
Lohr

(10) Patent No.: US 7,039,101 B2
(45) Date of Patent: May 2, 2006

(54) ARRANGEMENT FOR MULTICHANNEL SIGNAL TRANSMISSION BETWEEN MOBILE UNITS

(75) Inventor: Georg Lohr, Eichenau (DE)

(73) Assignee: Schleifring und Apparatebau GmbH, (DE)

( * ) Notice: Subject to any disclaimer, the term of this patent is extended or adjusted under 35 U.S.C. 154(b) by 595 days.

(21) Appl. No.: 10/139,187

(22) Filed: May 3, 2002

(65) Prior Publication Data

US 2002/0193075 A1    Dec. 19, 2002

Related U.S. Application Data

(63) Continuation of application No. PCT/DE00/03856, filed on Nov. 3, 2000.

(51) Int. Cl.
  *H04B 1/38* (2006.01)
  *H04L 27/28* (2006.01)

(52) U.S. Cl. ........................ 375/219; 375/260

(58) Field of Classification Search ............... 375/219, 375/220, 260; 370/276–285, 293–296

See application file for complete search history.

(56) References Cited

U.S. PATENT DOCUMENTS

| 3,859,469 A | | 1/1975 | Getgen | 179/15 AA |
| 4,131,766 A | * | 12/1978 | Narasimha | 370/484 |
| 4,697,092 A | | 9/1987 | Roggendorf et al. | 307/10 R |
| 6,665,349 B1 | * | 12/2003 | Cherubini et al. | 375/261 |

FOREIGN PATENT DOCUMENTS

EP    0 849 121 A1    6/1998

* cited by examiner

*Primary Examiner*—Don N. Vo
(74) *Attorney, Agent, or Firm*—St. Onge Steward Johnston & Reens LLC

(57) ABSTRACT

A device for multi-channel signal transmission between mobile units, including at least one first transmitter/unit that is coupled to at least one second transmitter/receiver unit via transmitting means. Further more the first transmitter/receiver unit and the second transmitter/receiver unit provide mutually tuned filter banks that filter predetermined characteristic spectral fractions out of the signal to be transmitted and which combine these signals to form a cumulative signal in the cast of transmission, that pass on these signals via directional switches which separate the signals of the transmission and reception path from each other or combine transmitted and received signals in such a way that they will be transmitted via common transmitting means.

4 Claims, 3 Drawing Sheets

ARRANGEMENT FOR MULTICHANNEL SIGNAL TRANSMISSION BETWEEN MOBILE UNITS

This application is a continuation of pending International Application No. PCT/DE00/03856 filed on Nov. 3, 2000, which designates the United States and claims priority of German Application No. 199 52 980.9 filed on Nov. 3, 1999.

FIELD OF THE INVENTION

The present invention relates to an array that may be used to transmit a great number of different signals simultaneously between units mobile relative to each other.

PRIOR ART

For transmission of signals between units mobile relative to each other, various techniques are known. Frequently, sliding contact arrays are used to this end, such as combinations of current collectors and contact rails or, in the case of a rotating movement, slip rings. Moreover, contact-less or non-contacting systems are known for transmitting signals between mobile units, which are based on capacitive, inductive or optical effects. In the majority of applications, it is not sufficient to transmit a single signal. Mostly the problem is encountered that a great number of different signals must be transmitted. The costs of an individual signal path are comparatively high in the known transmission technologies and, as a rule, they are increased in proportion to the number of the signals to be transmitted. Moreover, the situation in terms of space is frequently so narrow that it is not possible to provide separate transmission paths for all signals. An enhancement of this problem is described in the U.S. patent application Ser. No. 4,697,092 mentioning an array that transmits, in the case of a motor vehicle, on the one hand, a DC signal for the horn and, on the other hand, a signal modulated by means of a carrier via the same mechanical slip ring. To this end, the data is modulated by means of a modulator, e.g. in an FSK mode, and correspondingly demodulated in the receiver unit. This array entails the disadvantage that an additional engineering expenditure is required for modulating and demodulating the signal. Moreover, the modulation described here increases the bandwidth of the transmitted signal, and moreover the signal is transmitted in a higher frequency band in which a better radiation (stray radiation) is possible. As a result, the EMC characteristics of the system as a whole (stray radiation and noise tolerance) are substantially impaired. Apart therefrom, it is difficult to transmit wide-band signals via largely extended arrangements such as long contact paths or slip rings having a wide diameter. In this context, it is particularly important to consider a low frequency at a small signal bandwidth.

The U.S. Pat. No. 3,859,469 describes an array for multi-channel bi-directional signal transmission between two units connected to each other by a cable. There, the combination or separation of the signals is implemented by means of different filters, For example, different spectral fractions are associated with different directions. A substantial disadvantage of this array is the reduced bandwidth because the entire bandwidth available for the transmission through the cable is distributed to both directions, The bandwidth required for transmission through the cable corresponds at least to the total of the bandwidths of the signals for the individual directions. The demand for a bandwidth above the bandwidth of the useful signals hence entails a distinct impairment of the EMC characteristics. On the other hand, with a predetermined fixed bandwidth in transmission the achievable data or Information throughput is reduced.

BRIEF DESCRIPTIONS OF THE INVENTION

The present invention is based on the problem of providing an array for multi-channel signal transmission, which permits a small number of transmission paths of a transmission means between mobile units, a multi-channel signal transmission at very good EMC characteristics and low costs.

The solution to this problem is defined in claim 1. Expedient improvements are the subject matters of the dependent claims.

An array consists of a first transmitter/receiver unit 1 (the reference numerals set forth below refer to the drawing that will be explained in the following) and a second transmitter/receiver unit 3, which are connected by means of the transmitting means 2 for transmission of signals between mobile units. Each of these transmitter/receiver units is capable of transmitting or receiving signals, respectively. Each of these transmitter/receiver units comprises a filter bank 4 (19) that filters characteristic spectral fractions out of the signals 5a, 5b, 5d, 5d (15a, 15b, 15c, 15d) to be transmitted, and adds them to form a cumulative signal 13 (13b) to be transmitted. Moreover, these transmitter/receiver units include directional switches 9 (10) for adding or selecting transmitted and received signals in a way selective in terms of direction for combining them to form a signal that is transmitted by means of the transmitting means 2 to the respectively other transmitter/receiver unit. Moreover, each of these transmitter/receiver units comprises a filter bank 12 (6) matched with the transmitter unit of the respectively other transmitter/receiver unit, which bank filters the individual spectral fractions out of the signal to be transmitted, and disintegrates them again into their fractional signals. Furthermore, each transmitter/receiver unit comprises a set of regenerators 17a, 17b, 17c, 17d (7a, 7b, 7c, 7d) that regenerate signals 18a, 18b, 18c, 18b (8a, 8, 8c, 8d) out of the fractional signals of the filter bank, which regenerated signals correspond to the original signals. The regenerators may be amplifiers, for example, for restoring the original signal level or also comparators for pulse shaping. These regenerators may equally include storing elements for regenerating rectangular signals from short pulses.

The number of the signals transmitted per direction is generally not fixed to be as small as 4. In the present exemplary presentation, the number 4 has been selected for improved clarity. The number of the signals may also be different in both directions.

The term "directional switch" relates to a unit for the directionally selective separation of signals. Such circuits are also known by the term "hybrid 4-wire terminating set" or "directional coupler" in high-frequency technology. With the application of such a directional switch, signals can be transmitted in both directions within the same frequency band. It is also possible, of course, to transmit signals in the opposite direction by means of different frequency bands without a directional switch.

In another expedient embodiment of the invention, a first transmitter/receiver unit 1 is used on the transmitter side in the event of a unidirectional data transmission, which unit comprises exclusively one transmitter unit, as well as a second transmitter/receiver unit 3 is used on the receiver side, which unit 3 comprises a receiver unit exclusively. As here signals can be transmitted only in a single direction, the two directional switches 9 and 10 may be omitted.

In a further expedient embodiment of the invention, individual regenerators may be omitted when the signals to be transmitted are characterized by the transmitted signal spectrum as largely as possible. This is the case particularly when band-limiting signals are transmitted over their entire frequency band anyhow.

According to another embodiment of the invention, the directional switch 9 or 10, respectively, has a design selective in terms of frequency. With this provision, the overall system may be realized with a directional switch and filter banks in many cases at a low expenditure.

BRIEF DESCRIPTION OF THE DRAWING

In the following, the present invention will be described in an exemplary form by embodiments, without any restriction of the general inventive idea and with reference to the drawings that are explicitly referred to in all other respects as far as all inventive particulars are concerned that are not explained in details In the text. In the drawing.

DESCRIPTION OF EMBODIMENTS

Figure 1:
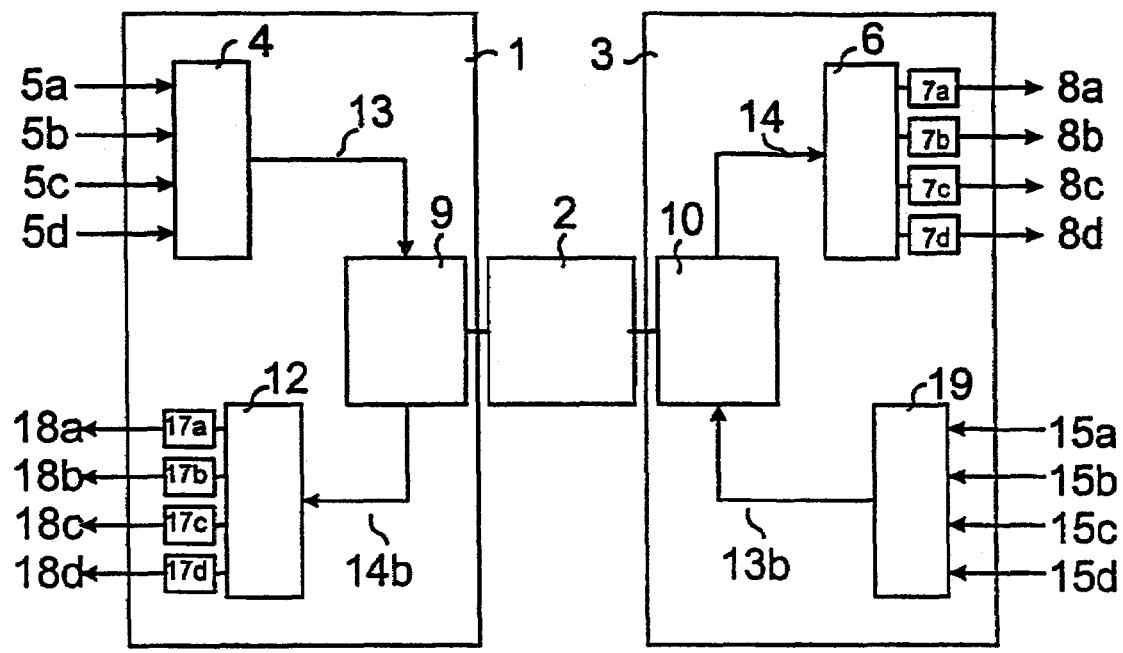
FIG. 1 illustrates an inventive array.

FIG. 1 illustrates an inventive array consisting of a first transmitter/receiver unit 1 that transmits signals to the second transmitter/receiver unit 3 by means of the transmitting unit for the transmission of signals between mobile units. The first transmitter/receiver unit 1 includes a first filter bank 4 that filters respective characteristic spectral ranges out of the different input signals 5a, 5b, 5c, 5d and adds them to form a cumulative signal 13 that is transmitted to the transmitting means 2 by means of a directional switch 9. The second transmitter/receiver unit 3 receives from the transmitting means 2 the transmitted signal that is separated into transmitted and received signals bys means of the directional switch 10 and then disintegrated again into its spectral fractions by means of the second filter bank 6. The second filter bank 6 is so dimensioned that its spectral characteristics correspond to the spectral characteristics of the first filter bank 4 in the first transmitter/receiver unit. The output signals of the second filter bank 6 are passed on to signal regenerators 7a, 7b, 7c, 7d that regenerate an output signal 8a, 8b, 8c, 8d by amplification, pulse-shaping or other regenerative provisions, which output signal corresponds to the original signal as largely as possible.

The second signal path has a corresponding structure in the opposite direction, The input signals 15a, 15b, 15c, 15d are processed by means of a further filter bank 19 in the second transmitter/receiver unit to form a cumulative signal 13b that is communicated via the transmitting means 2 to the first transmitter/receiver unit. In the latter unit, a directional switch 9 provides for a distribution of the signals with directional selectivity and communicates the signals 14b received in this unit to a further filter bank 12 that is tuned with the filter bank 19 associated with It. The output signals of the filter bank 12 are then processed by means of appropriate signal regenerators 17a, 17b, 17c, 17d to form the output signals 18a, 18b, 18c, 18d. The directional switches 9 (10) in this array serve the purpose of separating the signals of the two signal flow directions from each other in an unambiguous manner. In this manner, a cumulative signal 13 of the first filter bank 4 is passed on via the directional switch 9, the transmitting means 2 and the second directional switch 10 exclusively as signal 14 to the second filter bank 6 for analysis. The transmitting means 2 must here be designed for bi-directional data communication. Only a negligibly small fraction of the cumulative signal 13 should be transmitted as signal 14b via the directional switch 9 to the further filter bank 12. A signal transmission to the same side of the moving array is not desired expressis verbis, does not make sense from an engineering point of view, and should therefore also be suppressed. Signals should be transmitted exclusively via the transmitting means 2. The directional switches may also be expediently designed as frequency-selective components so that their directional effect will reach a maximum in particular frequency bands that are used exclusively for bi-directional transmission.

Figure 2:
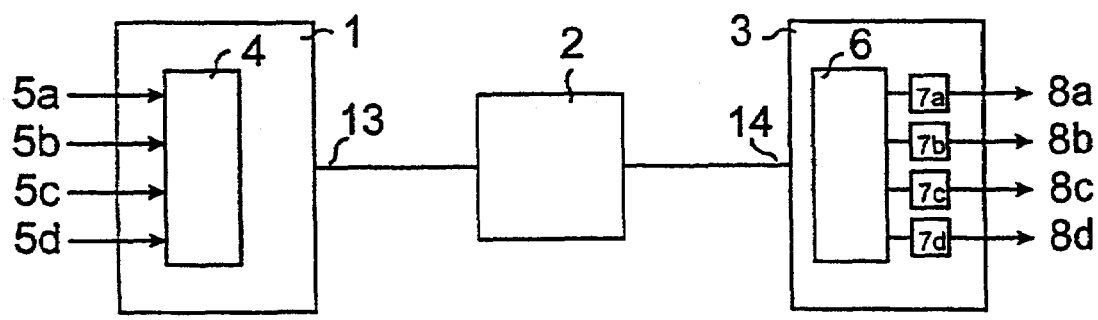
FIG. 2 shows an array for the bi-directional communication.

FIG. 2 shows an array for unidirectional data transmission in correspondence with the invention. Here, the first transmitter/receiver unit is configured as transmitter unit exclusively. Moreover, the second transmitter/receiver unit is designed as receiver unit exclusively. Both units are connected to each other by means of a transmitting unit. As in such a case the transmitter/receiver units transmit data exclusively in a single direction the two directional switches 9, 10 may be omitted.

Figure 3:
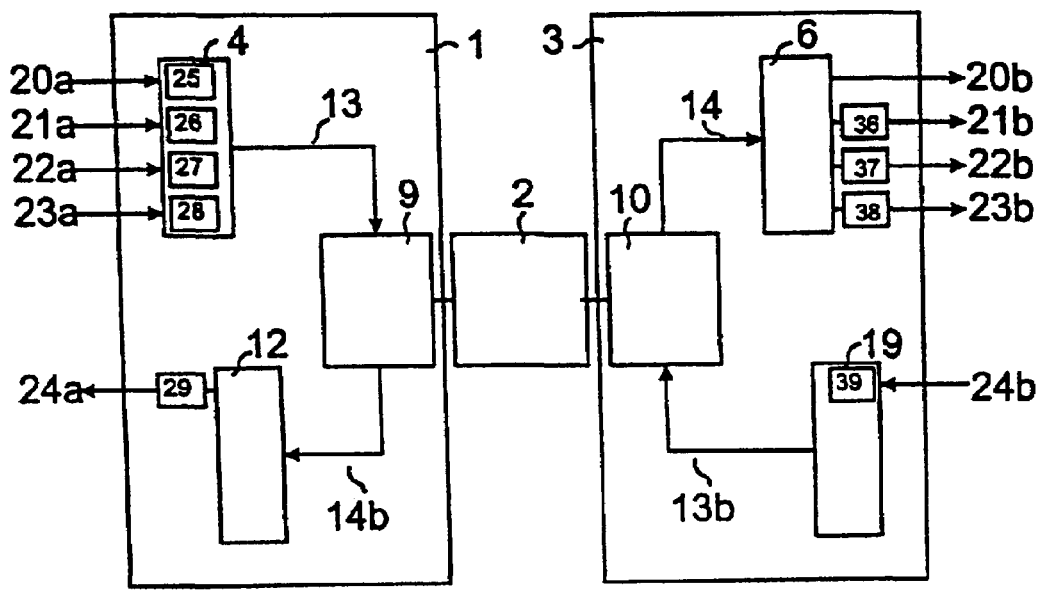
FIG. 3 is a view of an exemplary embodiment of the inventive array.

FIG. 3 illustrates an exemplary embodiment of the inventive array. This example is intended to support a better explanation of the principle of the invention. Here, the following signals are to be transmitted: a slow relay signal 20a with a switching rate of 10 Hz at maximum; an audio signal 21a in a bi-directional manner within the frequency range up to 3.5 kHz; a first bus signal 22a in semi-duplex operation with a maximum data rate of 200 kBaud as well as a second bus signal 23a with a maximum data rate of 4 MBaud in a first direction as well as a third bus signal 24a in the second direction with a maximum data rate of 4 MBaud. The filter bank 4 in the first transmitter/receiver unit now includes the following individual units: a first filter 25 with a low-pass characteristic, which permits DC transmission for the relay and has a pass-band up to a level as high as 20 Hz. A second filer 26 is provided for processing the audio signal 21a that has a band-pass characteristic within the frequency range from 100 Hz to 3.5 kHz. A third filter 27 is used to process the first bus signal 22a. This filter equally presents a band-pass characteristic with a frequency range from 10 kHz up to 800 kHz. The application of band-pass filters is permissible in the majority of advanced bus systems because they permit a DC-free or band-limited transmission of the signals with a suitable coding (bi-phase, bit staffing or other techniques). The transmission of the signals of the second bus system 23a is finally realized within a frequency band from 1 MHz up to 8 MHz. As with these signals, the spectral spacing from the signals of the first bus system is not wide enough a higher frequency range is filter out of the rectangular signals of the bus system, rather than using the base band for the transmission. Because of the band pass characteristic of the filter, which suppresses the fundamental wave, only short pulses remain (positive pulses at a rising edge, negative pulses at a decreasing edge) which are transmitted via the line. The filter bank 12 of the first receiver contains a filter with a band-pass characteristic in correspondence with the filter 39 in the second transmitter/receiver unit 3 for receiving the signals of the third bus system 24a. Here, both filters should equally present a band-pass characteristic within the frequency range from 4 MHz to 8 MHz, like the filter 28. A first signal regenerator 29 serves to convert the pulses limited in terms of bandwidth, which are transmitted via the transmitting means, into a signal corresponding to the original rectangular signal. This regenerator may consist of a comparator with hysteresis in the simplest case. The signals in the first transmitter/receiver unit 1 of the filter bank 4 as well as of the filter bank 12 are now combined with directional selection via a first directional switch 9 and coupled to the second directional switch 10 by means of the transmitting means 2. The latter switch couples the signals in the second transmitter/receiver unit 3 to the filter bank 6 as well as to the filter bank 19, again with directional selectivity. The second transmitter/receiver unit 3 contains a band-pass filter 30 for the transmission of the signals of the second bus system in the second direction as well as a filter bank 6 that is tuned to the frequency bands of the filter bank 4. The output signals of this filter bank 6 are processed by means of appropriate signal regenerators 36, 37, 38. Signal regeneration of the signal 20b (galvanic relay signal) is not required. The audio signal 21b is regenerated by means of a simple amplifier. The first test signal is converted into a rectangular signal by means of a comparator. The second bus signal 23b consists merely of short positive or negative pulses at the output of the filter bank 6. The original rectangular signal is then regenerated again in the signal regenerator y means of a comparator with appropriate hysteresis or by means of another memory element.

For the sake of improved clarity, the same reference numerals were assigned to input or output signals, respectively, which are associated with each other, however, with different alphabets given below. For example, the signal 20a becomes signal 20b after transmission by the transmission signal; the signal 21a becomes signal 21b and signal 22a becomes signal 22b, signal 23a becomes signal 23b, and finally the signal 22b (reverse transmission direction) becomes signal 24a.

Figure 4:
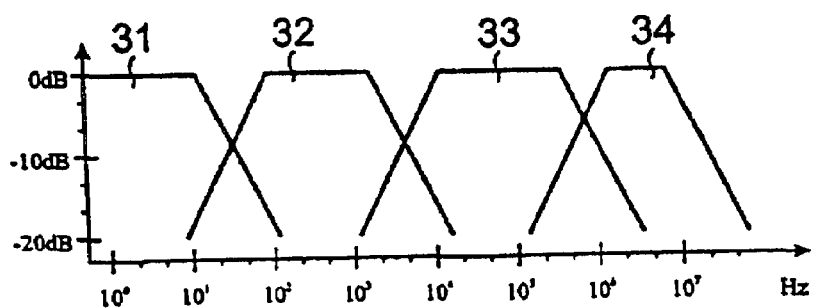
FIG. 4 illustrates an exemplary spectral distribution of the transmitted signals.

FIG. 4 shows the distribution into difference frequency ranges in correspondence with the example according to FIG. 3. The signal levels are plotted in the diagram versus the frequency. The low-frequency relay signal 20a is transmitted within the low-frequency spectrum 31. In the joining spectral range 32, the audio signal 21a is transmitted. The first bus signal 22a is transmitted in a middle frequency range 33. Finally, the second bus signal 23a or 24a, respectively, is transmitted in both directions within the same spectral range 34. In this case, the directionally selective separation is not realized by the application of different spectral ranges but rather by the use of directional switches. The directionally selective separation is, of course, also the subject matter of the invention due to the different signal ranges.

Figure 5:
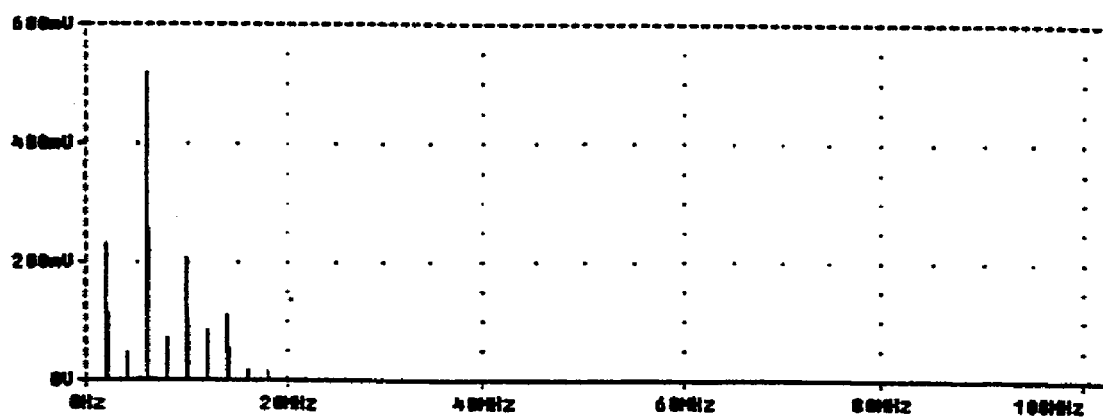
FIG. 5 is an illustration of an exemplary spectrum of a bus signal.

FIG. 5 illustrates the spectrum of the second bus signal 23a, in correspondence with the example according to FIG. 3, as it is transmitted via the transmitting means 2. Here, the limited bandwidth of the signal can be unambiguously recognized. The characteristic line spectrum derives from the rectangular bus signal.

Figure 6:
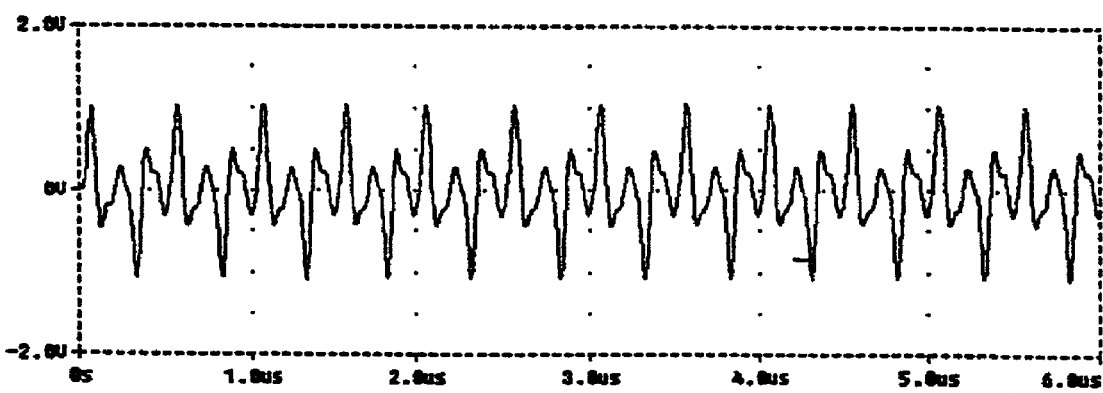
FIG. 6 shows an exemplary bus signal in the time interval.

FIG. 6 illustrates the signal of the second bus system 23a, in correspondence with the example according to FIG. 3, as it is transmitted via the transmitting means 2. This signal hence corresponds to the spectrum shown in FIG. 5. The high positive and negative peaks of the signal are each created at the respective points of time by which the rectangular signal, which is taken as a basis, presents positive or negative edges, respectively. A comparator may detect these positive or negative signal peaks in a simple manner. The original rectangular signal can hence be reconstructed by storing it, such as this is done by a comparator with hysteresis.

The invention claimed is:

1. Array for multi-channel transmission of signals between mobile units, consisting of at least one first transmitter/receiver unit that is coupled to at least one second transmitter/receiver unit via transmitting means, wherein respective filter banks are provided in said first and second transmitter/receiver units, which filter banks filter predetermined spectral fractions of the signals to be transmitted, combine these signals to form a cumulative signal in the case of transmission, and pass on these signals to additionally provided signal regenerators in the case of reception for regenerating the original signal, characterized in that directional switches are provided that separate the signals of the transmission and reception path from each other or combine transmitted and received signals in such a way that they will be transmitted via a common transmitting means, and that said filter banks are so designed that they filter characteristic spectral fractions out of the signals to be transmitted.

2. Array according to claim 1, characterized in that the case of an additional transmission of exclusively unidirectional signals merely the respective first transmitter/receiver unit comprises a filter bank that filters characteristic spectral ranges out of the individual signals to be transmitted and combines them to form a cumulative signal that is transmitted directly, without directional switches, to said transmitting means, and that additionally a second transmitter/receiver unit is configured exclusively for reception, which filters the signals of said transmitting means out by means of a second filter bank and communicates them to additionally provided signal regenerators for signal processing.

3. Array according to claim 2, characterized in that in the case of transmission of signals limited in terms of bandwidth, which may be detected almost over their entire spectrum, the signal path of these signals is provided exclusively with a filter bank for reception, without a joining signal regenerator.

4. Array according to claim 3, characterized in that said directional switch presents, in its turn, frequency-selective characteristics.

* * * * *